United States Patent
Dunn et al.

(10) Patent No.: US 11,145,108 B2
(45) Date of Patent: Oct. 12, 2021

(54) UNIFORM DENSITY CUBE MAP RENDERING FOR SPHERICAL PROJECTIONS

(71) Applicant: NVIDIA Corporation, Santa Clara, CA (US)

(72) Inventors: Alexander Dunn, Hayward, CA (US); Mathias Schott, Santa Clara, CA (US); John Spitzer, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/353,178

(22) Filed: Mar. 14, 2019

(65) Prior Publication Data

US 2019/0295310 A1    Sep. 26, 2019

Related U.S. Application Data

(60) Provisional application No. 62/646,248, filed on Mar. 21, 2018.

(51) Int. Cl.
| | |
|---|---|
| *G06T 15/04* | (2011.01) |
| *G09B 29/00* | (2006.01) |
| *G09G 5/36* | (2006.01) |
| *G06T 1/60* | (2006.01) |
| *G06T 15/00* | (2011.01) |

(52) U.S. Cl.
CPC ............. *G06T 15/04* (2013.01); *G06T 1/60* (2013.01); *G06T 15/005* (2013.01); *G09B 29/005* (2013.01); *G09G 5/363* (2013.01); *G06T 2215/06* (2013.01)

(58) Field of Classification Search
CPC ....... G06T 15/04; G06T 2215/06; G06T 1/60; G06T 15/005; G09B 29/005; G09G 5/363
See application file for complete search history.

(56) References Cited

U.S. PATENT DOCUMENTS

| | | | |
|---|---|---|---|
| 6,753,870 B2 | 6/2004 | Deering et al. | |
| 7,259,760 B1 | 8/2007 | Hashimoto et al. | |
| 7,865,013 B2 | 1/2011 | Hack | |
| 2007/0229503 A1* | 10/2007 | Witzel | G06T 15/503 |
| | | | 345/428 |
| 2008/0284797 A1* | 11/2008 | Hack | G06T 3/0062 |
| | | | 345/629 |
| 2012/0075428 A1* | 3/2012 | Seki | G06T 7/85 |
| | | | 348/47 |

(Continued)

FOREIGN PATENT DOCUMENTS

WO    1996003715    2/1996

OTHER PUBLICATIONS

Google Looks to Solve VR Video Quality Issues With Equi-Angular Cubemaps (EAC); Mar. 15, 2017.

*Primary Examiner* — Terrell M Robinson
(74) *Attorney, Agent, or Firm* — Shook, Hardy & Bacon L.L.P.

(57) ABSTRACT

A cube map is used for determining the appearance of a surface by means of a precomputed texture image. Embodiments of the present invention are drawn computer systems and methods for rendering a spherical projection as a cube map that mitigates non-uniform pixel density near the edges of the cube map to avoid artifacts and increase rendering performance.

21 Claims, 11 Drawing Sheets

(56) References Cited

U.S. PATENT DOCUMENTS

| | | | |
|---|---|---|---|
| 2012/0098926 A1* | 4/2012 | Kweon | H01L 27/14625 |
| | | | 348/36 |
| 2018/0041764 A1* | 2/2018 | Lin | H04N 19/105 |
| 2018/0089798 A1* | 3/2018 | Cerny | G02B 27/0172 |
| 2018/0164593 A1* | 6/2018 | Van Der Auwera | ......... |
| | | | H04N 21/816 |
| 2018/0268517 A1* | 9/2018 | Coban | G06T 17/00 |
| 2019/0385277 A1* | 12/2019 | Hutchinson | H04N 5/23238 |
| 2020/0053393 A1* | 2/2020 | Niamut | H04N 19/176 |
| 2020/0092582 A1* | 3/2020 | Xiu | H04N 19/61 |

\* cited by examiner

UNIFORM DENSITY CUBE MAP RENDERING FOR SPHERICAL PROJECTIONS

CROSS-REFERENCE TO RELATED APPLICATIONS:

This application claims the benefit of and priority to provisional patent application, Ser. No. 62/646,248, Attorney Docket Number NVID-P-WU-16-0056US0, entitled "UNIFORM DENSITY CUBE MAP RENDERING FOR SPHERICAL PROJECTIONS," with filing date Mar. 21, 2018, and hereby incorporated by reference in its entirety.

FIELD

Embodiments of the present invention generally relate to the field of computer graphics. More specifically, embodiments of the present invention relate to systems and methods for rendering spherical projections as cube maps.

BACKGROUND

A cube map can be used to determine the appearance of a surface (e.g., a reflective surface) by means of a precomputed texture image. The cube map may be used to store an image of the environment surrounding an object, for example. In this case, the surrounding environment is rendered into the cube map. Traditional approaches for rendering a spherical projection into a cube map tend to oversample regions near the corner or edges of the cube map, thereby wasting computing resources and degrading performance.

Rendering spherical projections as a cube map is a key technique in the areas of reflection mapping, omni-directional shadow maps, and environment maps for light capture probes. Oversampling regions of the cube map often results in visual distortion and artifacts. At the same time, although an entire clip space range is typically used for rendering cube map faces, due to perspective distortion of the spherical surface, only a subset of the pixels of the spherical surface is actually required during rasterization to achieve the desired post projection results.

Prior approaches to render a spherical projection utilize different mapping sizes and geometries to mitigate the effects of non-uniform pixel distribution, such as octahedral mapping, which uses eight faces to capture and store the surrounding environment. Other techniques include paraboloid mapping, pyramid mapping, and octahedron mapping. However, these techniques are detrimental to performance, both at rendering and evaluation time.

SUMMARY

Cube maps are used to store an image that can be applied to change the appearance of a rendered surface or object. The image in the cube map may represent a surrounding scene or environment, for example. When a spherical projection is rendered as a cube map using traditional techniques, oversampling and image distortion may occur, especially near the edges and corners of the cube map.

What is needed is a technique for rendering a spherical projection as a cube map that mitigates non-uniform pixel density near the edges of the cube map to avoid artifacts and increase rendering performance. Accordingly, methods and apparatuses for rendering a spherical projection as a cube map having relatively uniform pixel density are disclosed herein.

Embodiments of the present invention divide faces of a cube map into quadrant surfaces, and each quadrant surface is assigned a viewport. A first transformation function is used to determining coordinates of world-space vertexes projected onto the quadrant surfaces, which results in a non-uniform pixel density. The views of the viewports may be rendered concurrently using multi-viewport rendering based on the transformed coordinates. Thereafter, the rendered views are expanded into the faces of the cube map using a second transformation function that produces a cube map having a more uniform pixel density. In this way, non-uniform pixel density near the edges of the cube map is mitigated to avoid artifacts and increase rendering performance. The cube map may be stored in computer memory and later accessed during the rending of a scene. For example, the cube map may be accessed to render a scene using a shadow map or an environment map.

According to one embodiment, a method for rendering a spherical projection as a cube map includes dividing at least one cube face of the cube map into quadrant surfaces, assigning viewports to the quadrant surfaces, determining coordinates of world-space vertexes projected onto the quadrant surfaces, rendering views of the plurality of viewports using said coordinates, where said views include said vertexes, and expanding the views onto the at least one cube face, where the views expanded onto the at least one cube face have an approximately uniform pixel density.

According to some embodiments, the calculation $$\{u, v\} = \left\{ \frac{x}{\sqrt{x^2 + y^2 + 1}}, \frac{y}{\sqrt{x^2 + y^2 + 1}} \right\}$$

is used to determine positions of vertexes projected onto the quadrant surfaces, where $\{u, v\}$ represents the coordinates, and where $\{x, y\}$ represents Cartesian coordinates of vertexes within a respective quadrant surface.

According to some embodiments, a first rendering pass is performed to determine the coordinates of world-space vertexes projected onto the quadrant surfaces, and a second rendering pass is performed to expand the views into the at least one cube face.

According to some embodiments, the calculation:

$$\{u, v\} = \left\{ \frac{x}{w + x\alpha + y\beta}, \frac{y}{w + x\alpha + y\beta} \right\},$$

where $$\alpha = \frac{x - u}{u(x + y)},$$

wherein $|\beta| = |\alpha|$, and where W represents a perspective value, is used to expand the views onto the cube faces.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
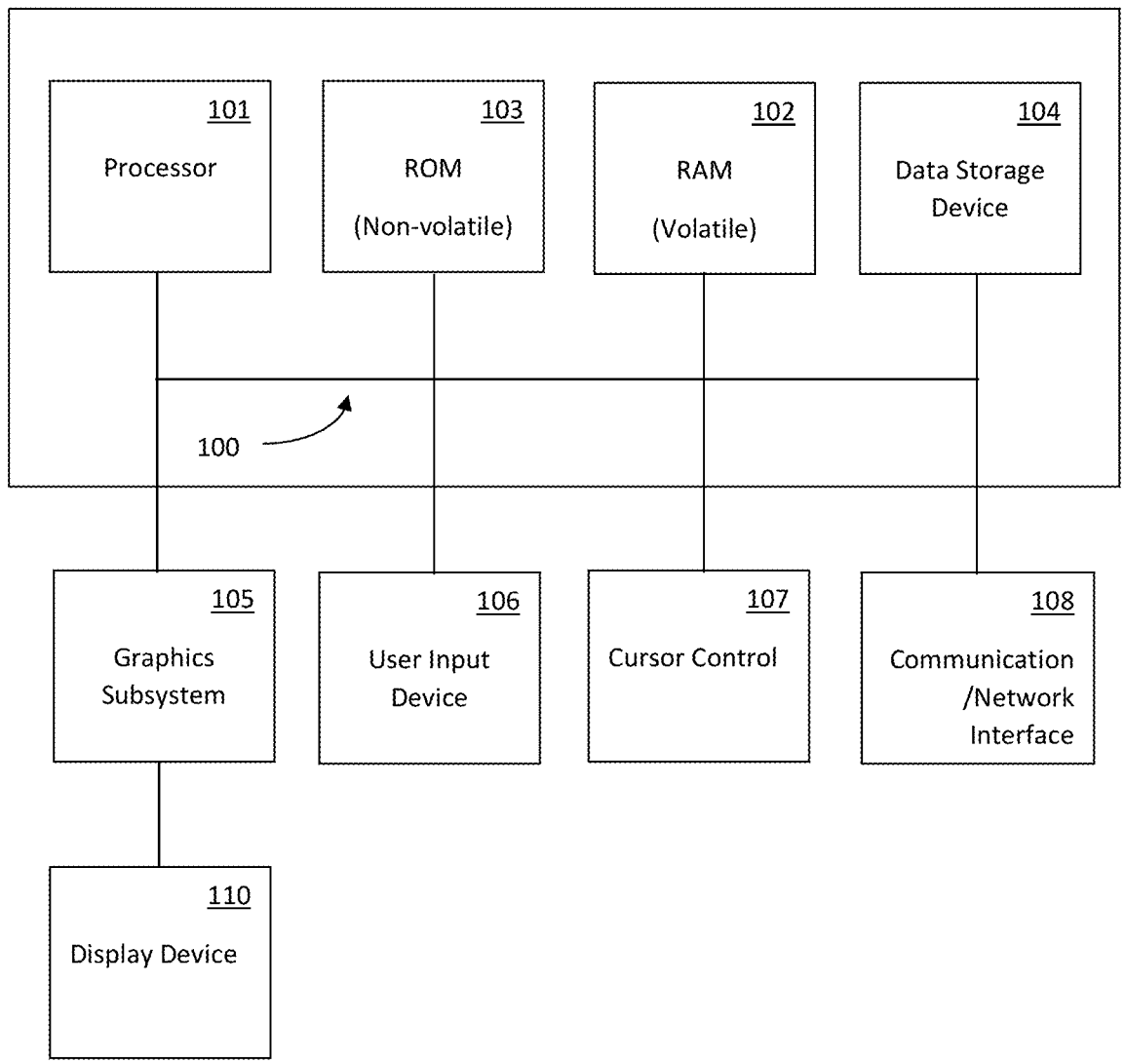
FIG. 1 is a block diagram of an exemplary computer system for rendering a spherical projection as a cube map having uniform pixel density depicted according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 4) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System

Embodiments of the present invention are drawn to computer systems for rendering a spherical projection into a cube map that mitigates non-uniform pixel density near the edges of the cube map to avoid artifacts and increase performance. The following discussion describes such exemplary computer systems.

In the example of FIG. 1, the exemplary computer system 112 includes a central processing unit (CPU) 101 for running software applications and optionally an operating system. Random access memory 102 and read-only memory 103 store applications and data for use by the CPU 101. Data storage device 104 provides non-volatile storage for applications and data and may include fixed disk drives, removable disk drives, flash memory devices, and CD-ROM, DVD-ROM or other optical storage devices. The optional user inputs 106 and 107 comprise devices that communicate inputs from one or more users to the computer system 112 (e.g., mice, joysticks, cameras, touch screens, and/or microphones).

A communication or network interface 108 allows the computer system 112 to communicate with other computer systems, networks, or devices via an electronic communications network, including wired and/or wireless communication and including an Intranet or the Internet. The display device 110 may be any device capable of displaying visual information in response to a signal from the computer system 112 and may include a flat panel touch sensitive display, for example. The components of the computer system 112, including the CPU 101, memory 102/103, data storage 104, user input devices 106, and graphics subsystem 105 may be coupled via one or more data buses 100.

In the embodiment of FIG. 1, a graphics sub-system 105 may be coupled with the data bus and the components of the computer system 112. The graphics system may comprise a physical graphics processing unit (GPU) 105 and graphics/video memory. GPU 105 may include one or more rasterizers, transformation engines, and geometry engines, and generates pixel data from rendering commands to create output images. The physical GPU 105 can be configured as multiple virtual GPUs that may be used in parallel (e.g., concurrently) by a number of applications or processes executing in parallel, or multiple physical GPUs may be used simultaneously. Graphics sub-system 105 can output display data to display device 110.

The graphics sub-system 105 may be configured to perform multi-viewport rendering, where scenes for multiple viewports are rendered in a single pass. The graphics sub-system may perform operations such as determining projected cube map face screen coordinates {u, v} based on the value of Cartesian coordinates {x, y}, and unwrapping a cube face projection for 2D screen space (e.g., "clip space") using a best fit representation by performing a perspective divide so that the projection comprises approximately uniform pixel density. According to some embodiments, the graphics sub-system 105 may include specialized cube map texture fetching hardware resident therein for quickly and efficiently fetching cube map textures.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Exemplary Cube Map Face Rendering

Figure 2A:
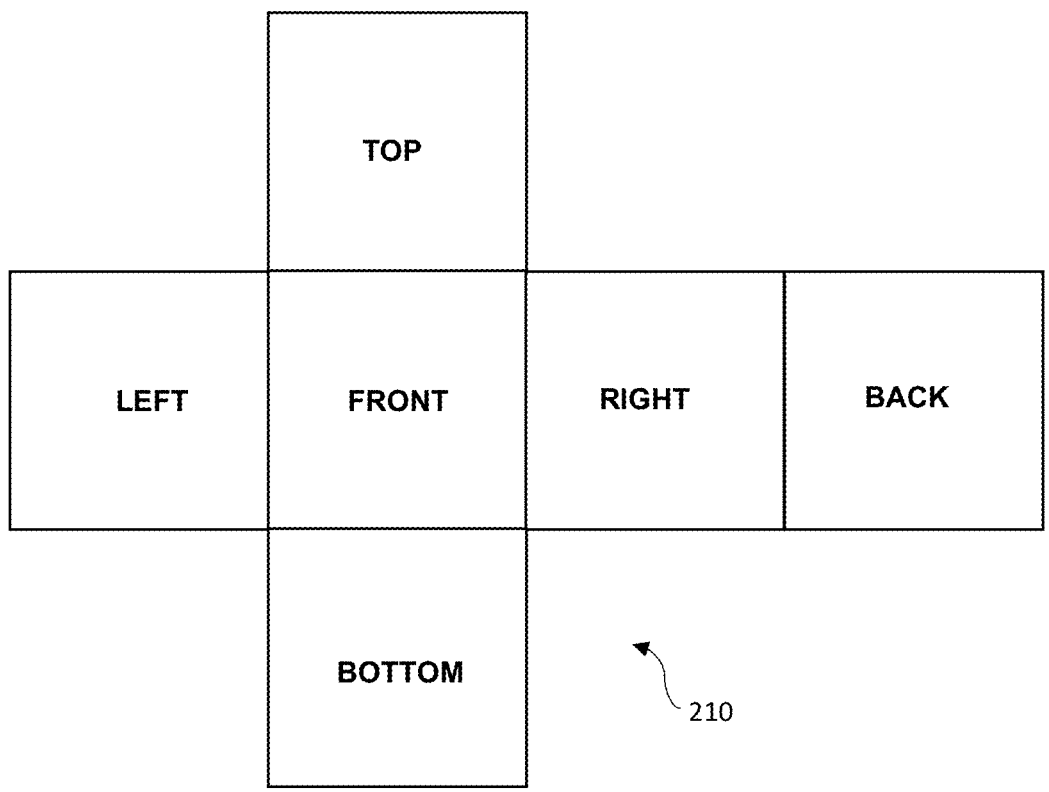
FIG. 2A is a diagram of an exemplary "unwrapped" cube map having six cube faces.

With regard to FIG. 2A, an exemplary "unwrapped" cube map 210 having six cube faces is depicted. For convenience, the cube faces are labeled top, bottom, left, right, front, and back, although any orientation can be used. The cube map 210 is operable to store an image that can be subsequently applied to an object during rendering to change the appearance of the object. For example, a spherical projection, such as a surrounding scene or environment, may be captured into a cube map for use during rendering of the scene. When a spherical projection is rendered as a cube map 210 using traditional rendering techniques, regions near the corner or edges of the cube map are oversampled, thereby wasting computing resources and degrading performance. Furthermore, oversampling regions of the cube map often results in visual distortion and artifacts. Embodiments of the present invention can render a best fit representation of the faces of cube map 210 to achieve a more uniform pixel density when used to represent a spherical projection.

Figure 2B:
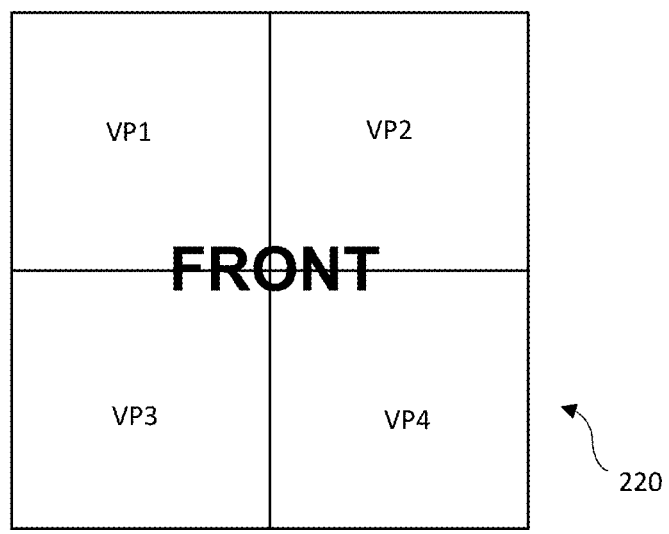
FIG. 2B is a diagram of an exemplary cube map face divided into quadrants depicted according to embodiments of the present invention.

With regard to FIG. 2B, an exemplary cube map face 220 divided into quadrants is depicted according to embodiments of the present invention. In this example, Viewport VP1 is assigned to a top-left quadrant, viewport VP2 is assigned to a top-right quadrant, viewport VP3 is assigned to a bottom-left quadrant, and viewport VP4 is assigned to a bottom-right quadrant. As described in detail below, embodiments of the present invention determine positions of vertexes projected onto the quadrants, and the views from the perspective of the viewports are rendered. According to some embodiments, the viewports are rendered substantially concurrently using hardware configured for multi-viewport rendering. Subsequently, the rendered cube face projections are unwrapped for 2D screen space (e.g., "clip space") using a best fit representation of the cube map face to achieve a more uniform pixel density.

Figure 2C:
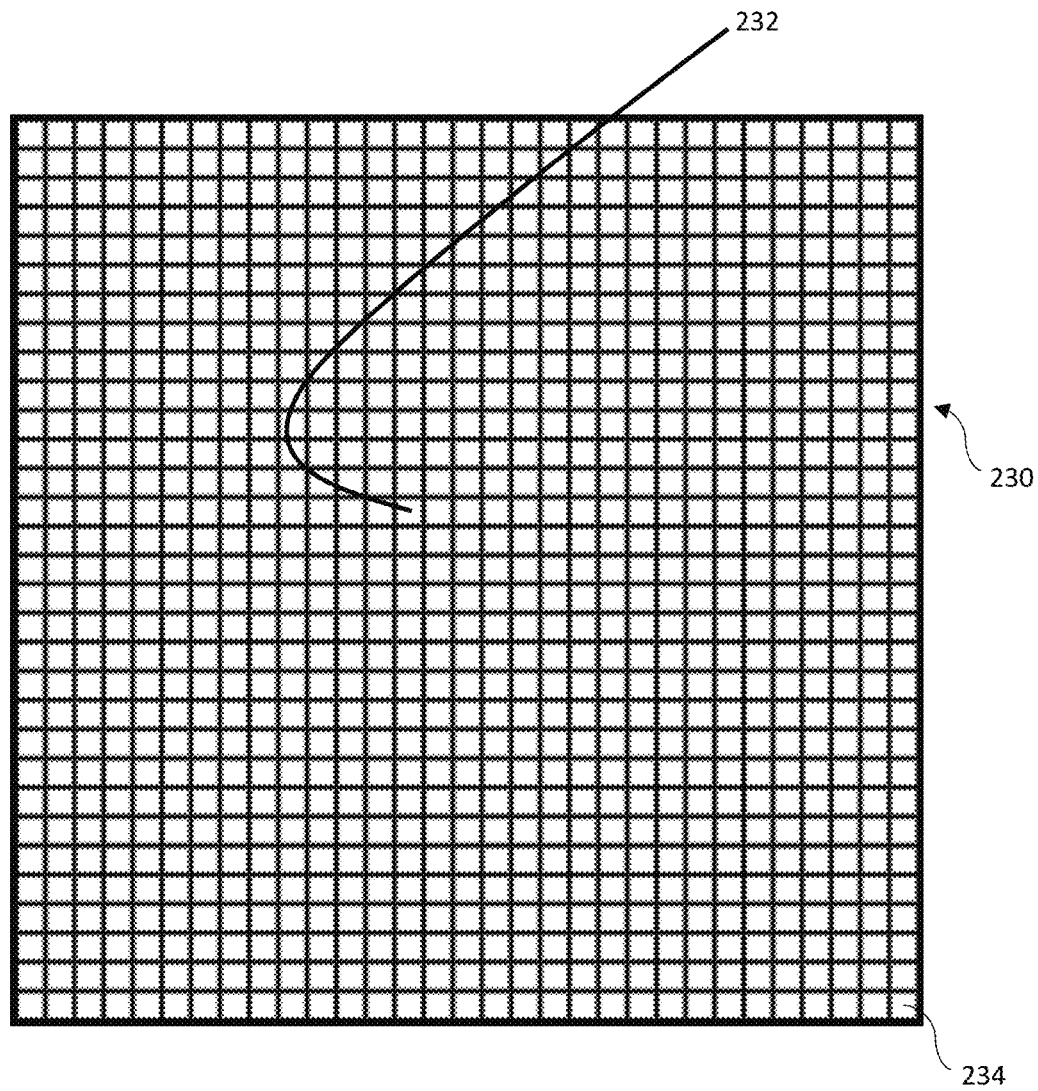
FIG. 2C is diagram of an exemplary render target of an individual cube map face with uniform pixel density.

With regard to FIG. 2C, an exemplary render target of an individual cube map face 230 is depicted. The cube map face 230 includes a plurality of pixels with perfectly uniform pixel density, meaning that the size of a pixel 232 near the center of the cube map face 230 is the same as the size of a pixel 234 near the corner of the render target 230. In other words, the cube map face 230 is not distorted or prone to oversampling.

With regard to FIG. 2D, the cube map face 230 depicted in FIG. 2C is projected from a 3D sphere onto a 2D plane using a transformation function to be described later according to embodiments of the present invention. The 3D sphere represents a surrounding environment or scene. In this way, the spherical projection can be encoded and/or stored in memory as a cube map. As illustrated in FIG. 2B, the resultant cube face projection 240 is distorted and displays non-uniform pixel density. Specifically, the pixels are smaller and more tightly grouped near the corners and edges of the projection compared to the pixels near the center of the projection. For example, a pixel 242 near the center of the cube face projection 240 appears larger than a pixel 244 near the corner of the cube face projection 240.

Figure 2D:
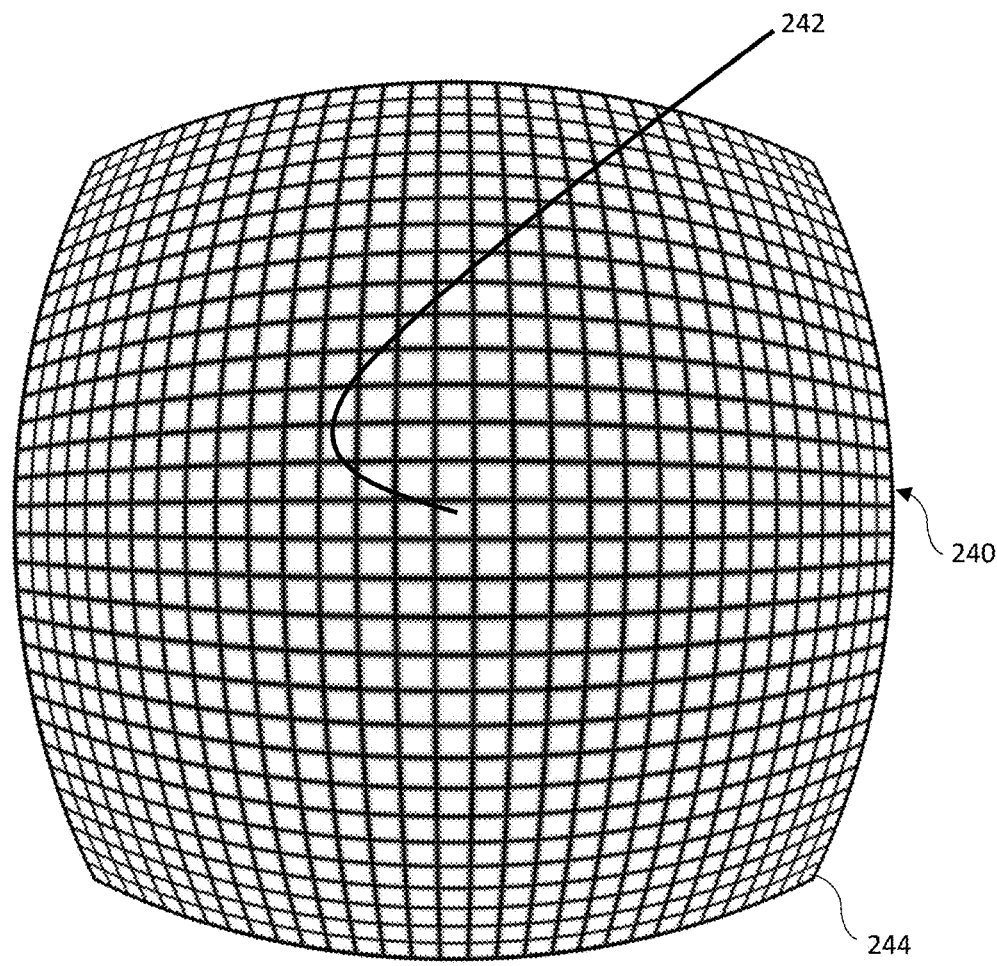
FIG. 2D is a diagram of an exemplary cube map face projected from a 3D sphere onto a 2D plane using a transformation function according to embodiments of the present invention.
Figure 2E:
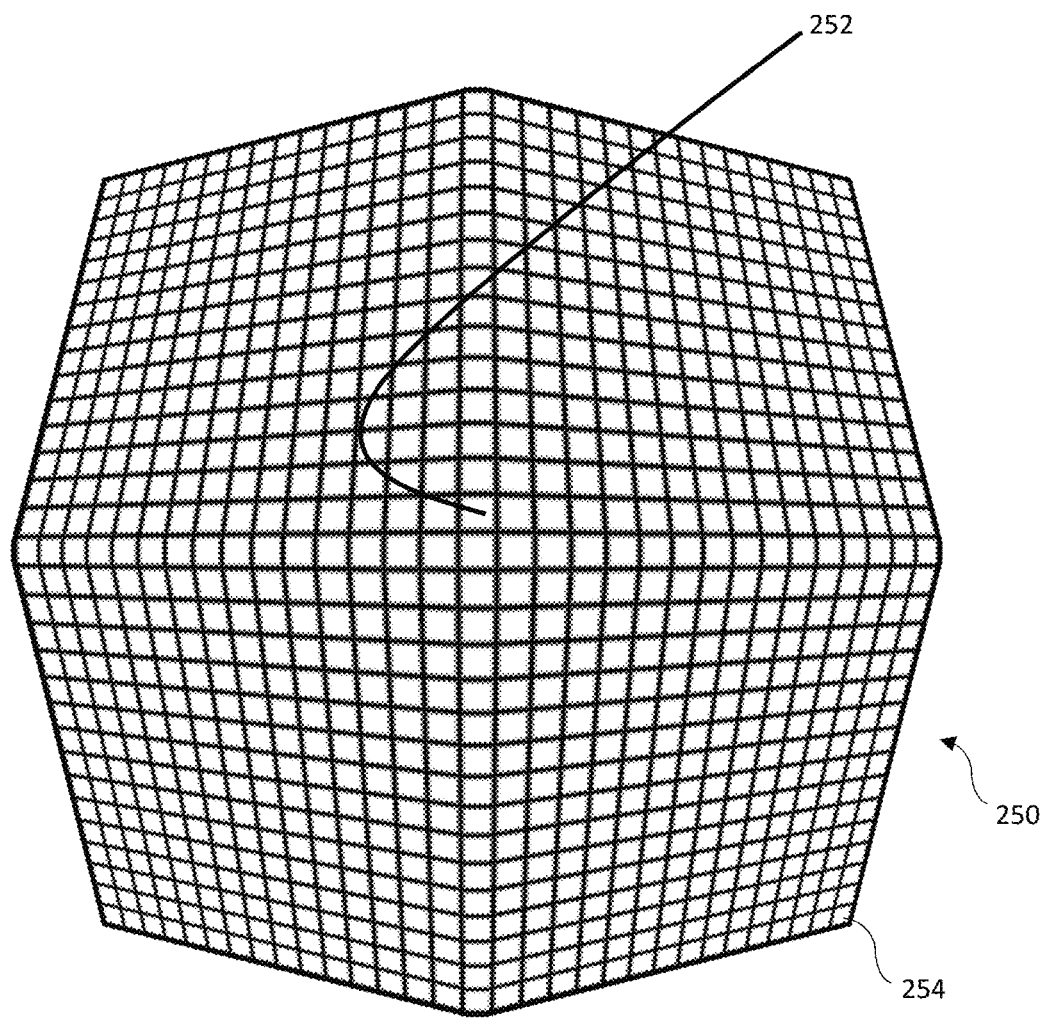
FIG. 2E is a diagram of an exemplary cube face projection transformed (e.g., unwrapped) for 2D screen space using a transformation function that determines a "best fit" representation of a 3D cube map face projection according to embodiments of the present invention.

FIG. 2E depicts the cube face projection 240 from FIG. 2D transformed (e.g., unwrapped or expanded) to a sheared or skewed plane in 2D screen space using a transformation function that determines a "best fit" representation 250 of a cube map face projection according to embodiments of the present invention. As illustrated in FIG. 2E, the unwrapped best fit representation 250 displays more uniform pixel density compared to the cube face projection 240 of FIG. 2D. For example, a pixel 252 near the center of the unwrapped best fit representation 250 is approximately the same size as pixel 254 near the corner of the cube face projection 240.

Figure 2F:
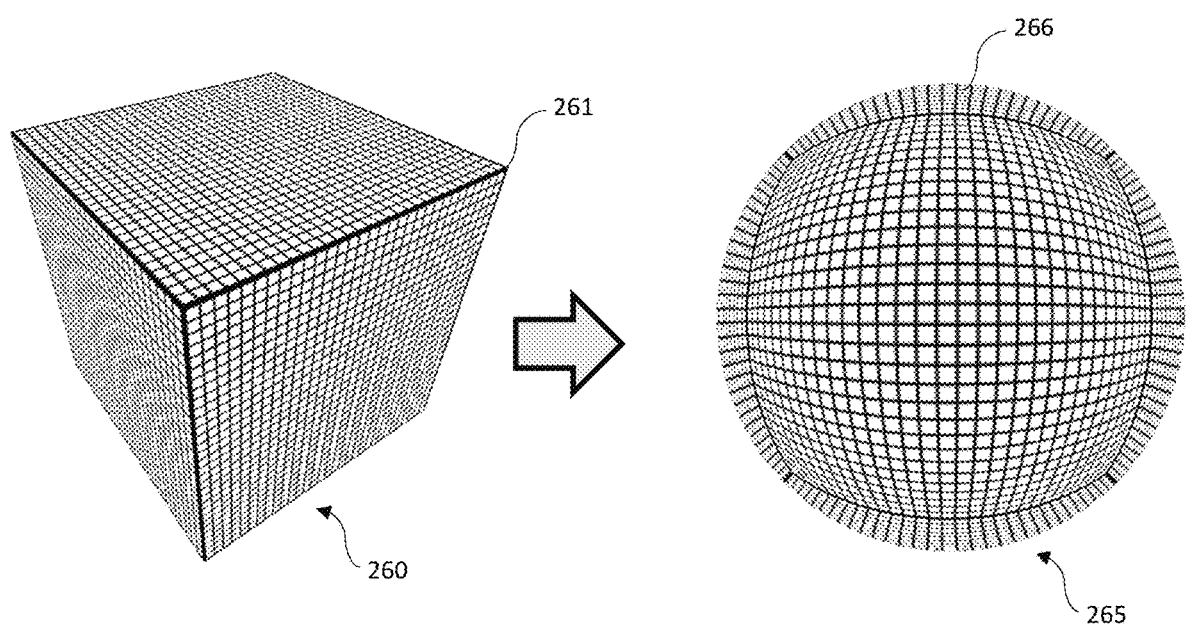
FIG. 2F is a diagram depicting an exemplary cube map and distorted spherical projection.

FIG. 2F depicts an exemplary cube map 260 projected onto an exemplary spherical projection 265. When the spherical projection 265 is rendered using traditional rendering techniques, regions near the corner or edges of the cube map (e.g., corner 261) are oversampled, thereby wasting computing resources and degrading performance. Furthermore, oversampling regions of the cube map often results in visual distortion and artifacts (e.g., distortion 266). Therefore, according to embodiments of the present invention, a best fit representation of the faces of cube map 260 is used to achieve a more uniform pixel density for representing the spherical projection, and the resultant projection is transformed to mitigate said artifacts.

Figure 2G:
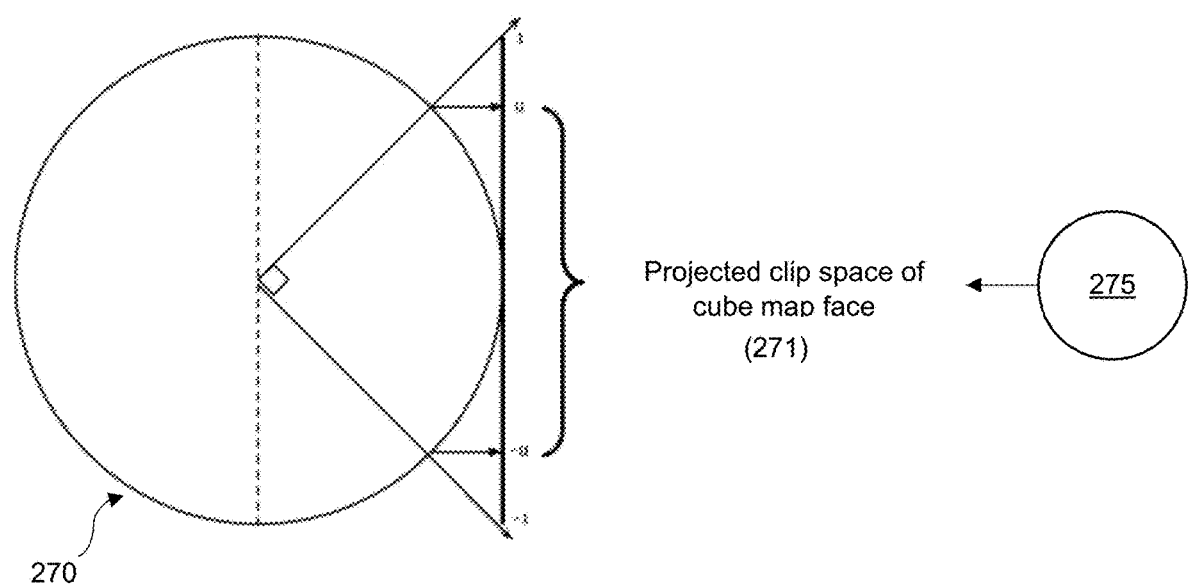
FIG. 2G is a diagram depicting the projected clip space of an exemplary cube map face according to embodiments of the present invention.

FIG. 2G depicts the projected clip space 271 of an exemplary cube map face. When rendering cube map faces, the entire clip space range {1,−1} is typically used for rendering. However, due to perspective distortion of the sphere surface, rasterization can be performed using the range of screen coordinates {u, −u} to achieve the same post projection results. For example, from the perspective of observer 275 facing spherical projection 270, only the portion of the spherical projection between screen coordinates {u, −u} is required for rasterization. The region of the spherical projection between screen coordinates {1, u} and {−u, −1} can be skipped, thereby mitigating oversampling and improving performance during rasterization.

Exemplary Cube Map Face Transformation and Best Fit Unwrapping

As mentioned above, a transformation function may be used to determine the coordinates of the world-space vertexes projected onto the cube map faces, or quadrant surfaces thereof. The transformation function determines the coordinates of the projected cube map face from Cartesian coordinates using Equation I:

$$\{u, v\} = \left\{ \frac{x}{\sqrt{x^2 + y^2 + 1}}, \frac{y}{\sqrt{x^2 + y^2 + 1}} \right\} \quad \text{Equation I}$$

Equation I determines the projected cube map face screen coordinates $\{u, v\}$ based on the value of Cartesian coordinates $\{x, y\}$. As mentioned above with regard to FIG. 2B, the resultant cube face projection 220 is distorted and has non-uniform pixel density. Subsequently, the cube face projection is unwrapped for 2D screen space (e.g., "clip space") to a sheared or skewed plane using a best fit representation of the 3D cube map face projection by performing a perspective divide so that the projection comprises approximately uniform pixel density (Equation II).

$$\{u, v\} = \left\{ \frac{x}{w + x\alpha + y\beta}, \frac{y}{w + x\alpha + y\beta} \right\} \quad [\alpha = \beta, w = 1] \quad \text{Equation II}$$

Figure 3:
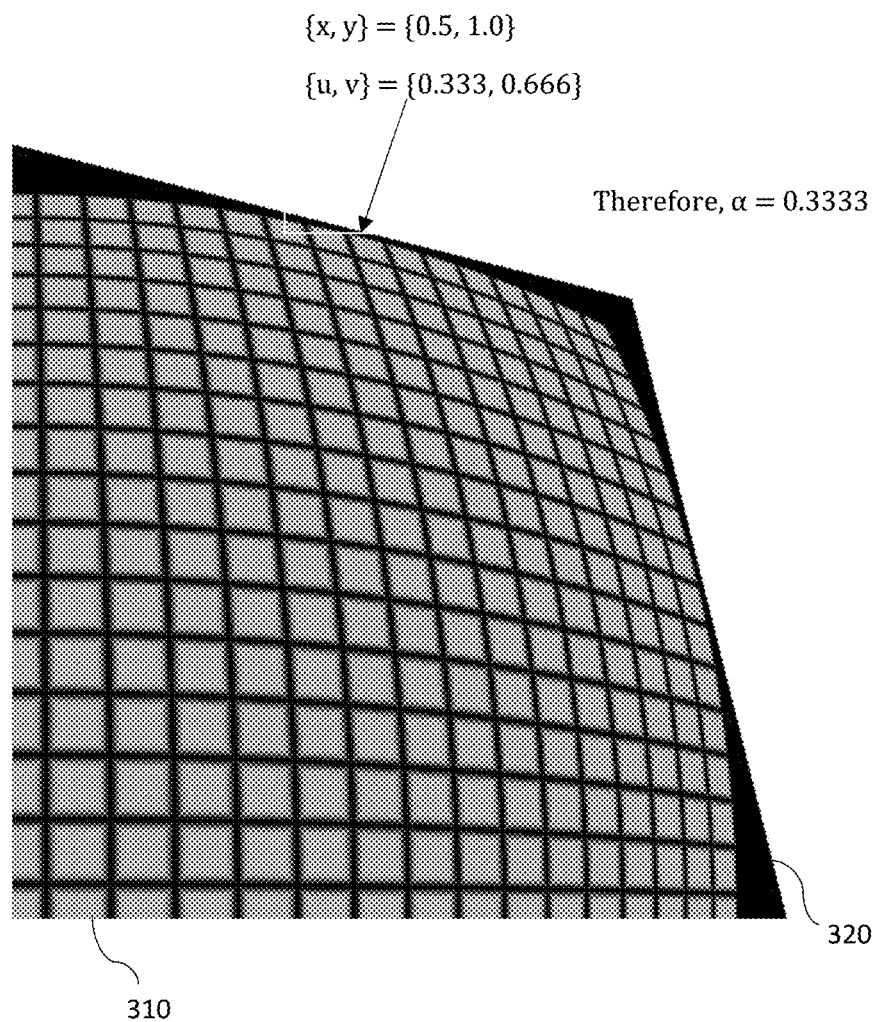
FIG. 3 is a diagram depicting the transformation of a cube face projection for 2D screen space using a best fit approach according to embodiments of the present invention.

FIG. 3 depicts an exemplary best fit approach for transforming a cube face projection 310 for 2D screen space according to embodiments of the present invention. The value of a is determined such that the transformation function is configured correctly for cube map rendering. This can be accomplished by finding the best fit for the spherical projection 310 inside the unwrapped projection 320. According to some embodiments, the value of a is determined such that the spherical projection 310 contacts the unwrapped projection 320 at $\{x, y\} = \{0.5, 1.0\}$, as depicted in FIG. 3, where the clip space ranges from 0 to 1. In FIG. 3, the value of $\{u, v\}$ is determined to be $\{0.333, 0.666\}$, and $\alpha = 0.3333$.

According to some embodiments, the value of $\alpha$ is determined by calculating $$\alpha = \frac{x - u}{u(x + y)}.$$

The value of $\beta$ can be similarly determined:

$$\beta = \frac{y - v}{v(x + y)}.$$

The $\alpha$ and $\beta$ values are sheared projection coefficients for projecting world space vertexes onto a surface. Here, the $\alpha$ and $\beta$ values are used to determine the best fit for fitting the spherical projection inside the unwrapped projection relative to an outermost corner (see FIG. 3) of a quadrant surface. Using the example of FIG. 3, the value of $\alpha$ can be determined by the calculation $$\frac{x - u}{u(x + y)} = \frac{0.5 - 0.333}{0.333(0.5 + 1.0)} = 0.3333.$$

According to some embodiments, the $\alpha$ and $\beta$ values are determined such that the cube face quadrants cumulatively represent a 90 degree range in azimuth and elevation of the total spherical projection. According to some embodiments, the absolute value of $\alpha$ equals the absolute value of $\beta$ for each respective viewport when the projection is symmetrical, such as for a cube map spherical projection.

The value of w represents the width relative to the depth of the vertex (e.g., perspective), and the value of w equals 1 at the point of the plane of projection that is farthest away from the viewport. The best fit may be determined for one viewport, and subsequently applied (e.g., transversely) to the remaining viewports. Alternatively, the best fit may be calculated independently for each viewport. According to some embodiments, each cube map face is divided into quadrants, and each quadrant is assigned a viewport.

Figure 4:
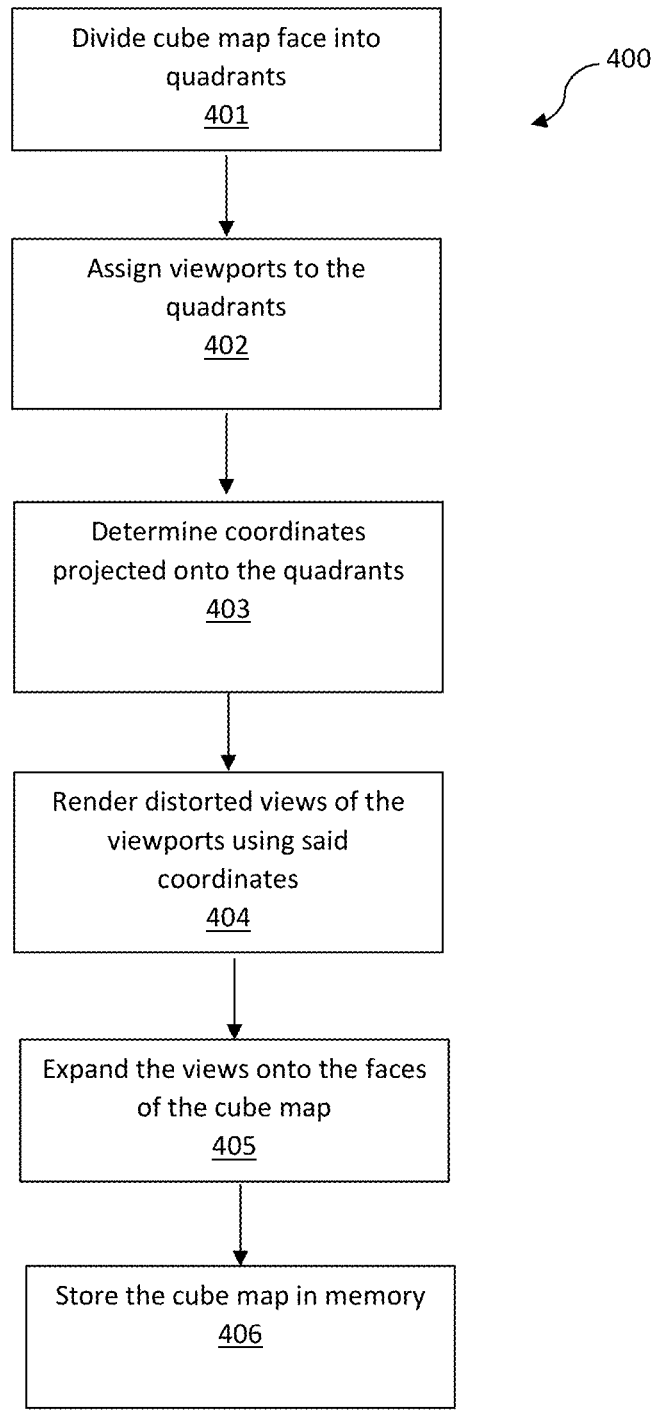
FIG. 4 is a flow-chart of an exemplary sequence of computer-implemented steps for rendering a spherical projection as a cube map with uniform pixel density depicted according to embodiments of the present invention.

With regard to FIG. 4, an exemplary sequence of computer-implemented steps 400 for rendering a spherical projection as a cube map with relatively uniform pixel density is depicted according to embodiments of the present invention. The steps 400 prevent oversampling near the edges and corners of the cube map to improve the rendering performance and image quality when rendering the spherical projection as a cube map.

At step 401, the six faces of the cube map are portioned into equal sized quadrants (e.g., quadrant surfaces). At step 402, viewports are assigned to the quadrants. For example, one viewport may be assigned to each quadrant, totaling 24 viewports per cube map. At step 403, coordinates of vertexes projected onto the quadrants in a three-dimensional coordinate system (e.g., world space) are determined. The coordinate positions of the projected vertexes $\{u, v\}$ can be determined using the formula:

$$\{u, v\} = \left\{ \frac{x}{\sqrt{x^2 + y^2 + 1}}, \frac{y}{\sqrt{x^2 + y^2 + 1}} \right\}.$$

This step results in a distorted cube face projection having non-uniform pixel density.

At step 404, the views from the perspective of the viewports are rendered. At this stage, the respective views of the viewports are distorted and have non-uniform pixel density. At step 405, the distorted cube face projection is unwrapped/expanded for 2D screen space (e.g., "clip space") using a best fit representation of the 3D cube map face. A transformation function is applied such that the 2D projection comprises approximately uniform pixel density, and the resultant unwrapped and undistorted views are stored in the faces of the cube map. The formula $$\{u, v\} = \left\{ \frac{x}{w + x\alpha + y\beta}, \frac{y}{w + x\alpha + y\beta} \right\}$$

can be used to expand (e.g., transform or unwrap) the views onto the cube faces, where $$\alpha = \frac{x - u}{u(x + y)}.$$

At step 406, the resultant cube map is stored in computer memory. Subsequently, a lookup operation may be performed to determine values of a scene using the cube map, where the cube map is a shadow map or environment map, for example, and the scene may be rendered according to the values.

Figure 5:
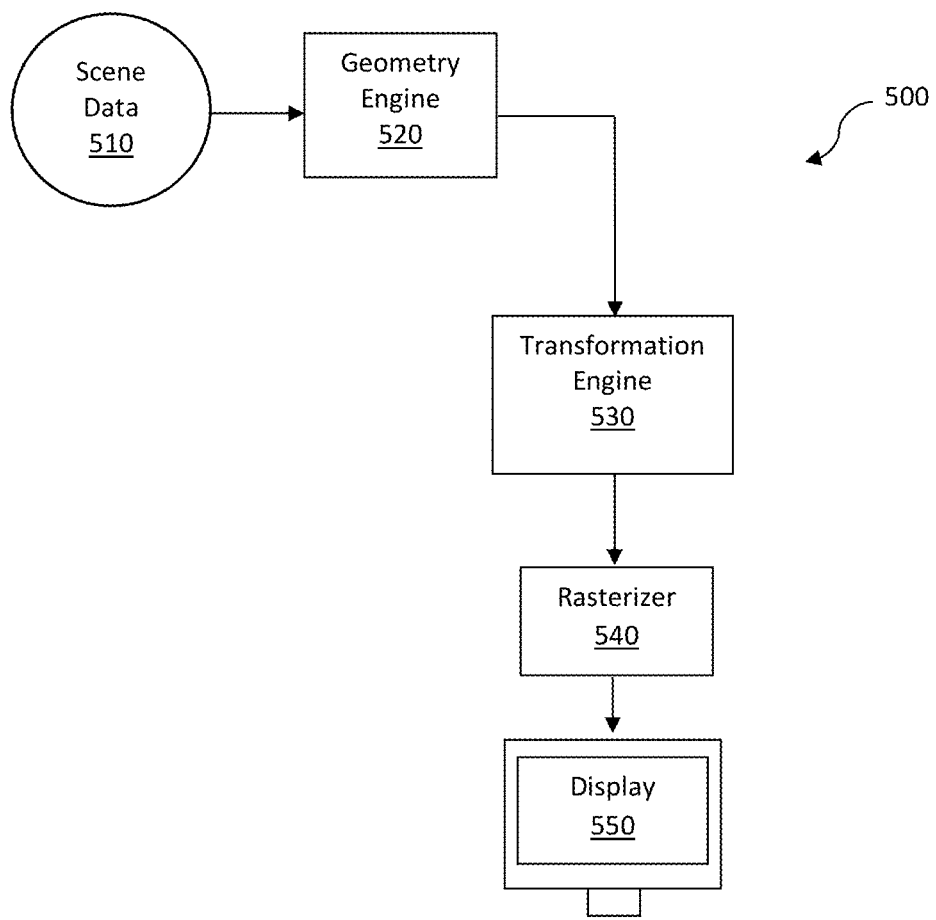
FIG. 5 is a block diagram and data flow diagram for rendering a spherical projection as a cube map with uniform pixel density depicted according to embodiments of the present invention.

With regard to FIG. 5, an exemplary block diagram and data flow diagram 500 for rendering a spherical projection as a cube map with uniform pixel density is depicted according to embodiments of the present invention. 3D scene data 510 representing a surrounding environment is fed to a geometry engine 520. The geometry engine 520 applies transformations (e.g., vertex shading, tessellation, etc.) and generates the outputs for all viewports. Transformation engine 530 may perform operations such as determining projected cube map face screen coordinates {u, v} based on the value of Cartesian coordinates {x, y} (Equation I), and unwrapping the cube face projection for 2D screen space (e.g., "clip space") using a best fit representation by performing a perspective divide so that the projection comprises approximately uniform pixel density (Equation II). The resultant cube map with nearly uniform pixel density may be stored in computer memory and used to render one or more geometric primitives. The primitives are rasterized to create the frame buffer image (e.g., a bitmap) for display using rasterizer 540. The rasterized image is output to display device 550 for display.

According to some embodiments of the present invention, the cube map is an environment map used for light capture probes. According to other embodiments, the cube map is an omni-directional shadow map. According to other embodiments, the cube map is used to determine a radiance value of a pixel or texel used for light calculation.

According to some embodiments, lookup operations performed on a cube map generated by embodiments of the present invention are performed using cube map texture fetching hardware. According to some embodiments, the cube map texture fetching hardware is a component of a GPU.

Embodiments of the present invention are thus described. While the present invention has been described in particular embodiments, it should be appreciated that the present invention should not be construed as limited by such embodiments, but rather construed according to the following claims.

What is claimed is:

1. A computer implemented method comprising:
dividing at least one cube face of a cube into a plurality of surfaces;
assigning viewports to the plurality of surfaces;
determining coordinates of vertexes of a spherical shape in world-space projected onto the plurality of surfaces;
generating rendered views of the spherical shape projected onto the plurality of surfaces from perspectives of the viewports based at least on rendering the views using the coordinates, wherein the views comprise the vertexes; and
generating a cube map based at least on expanding the rendered views into the at least one cube face, wherein the expanding comprises applying a transformation function to the rendered views of the spherical shape thereby increasing a uniformity of pixel density of the rendered views by adjusting world-space pixel sizes of pixels of the rendered views.

2. A method as described in claim 1, wherein the transformation function is a first transformation function and the determining the coordinates of the vertexes is performed using a second transformation function:

$$\{u, v\} = \left\{\frac{x}{\sqrt{x^2 + y^2 + 1}}, \frac{y}{\sqrt{x^2 + y^2 + 1}}\right\},$$

wherein {u, v} represents the coordinates, and
wherein further {x, y} represents Cartesian coordinates of vertexes within a respective surface of the plurality of surfaces.

3. A method as described in claim 1, further comprising:
performing a first rendering pass that performs the determining the coordinates of the vertexes and the rendering of the views; and
performing a second rendering pass that performs the expanding.

4. A method as described in claim 1, wherein the expanding the rendered views into the at least one cube face is performed using the transformation function:

$$\{u, v\} = \left\{\frac{x}{w + x\alpha + y\beta}, \frac{y}{w + x\alpha + y\beta}\right\},$$

wherein $$\alpha = \frac{x - u}{u(x + y)},$$

wherein |β|=|α|, wherein {u, v} represents the vertexes projected onto the plurality of surfaces, wherein w represents a perspective value, and wherein further {x, y} represents Cartesian coordinates of vertexes within a respective surface of the plurality of surfaces.

5. A method as described in claim 1, wherein the spherical shape represented in the rendered views is transformed into a plurality of planes, each plane corresponding to a respective viewport of the viewports.

6. A method as described in claim 1, wherein the expanding includes shearing the spherical shape represented in the rendered views based at least on a portion of the spherical shape that is between screen coordinates.

7. A method as described in claim 1, wherein the expanding unwraps regions of the spherical shape represented in the rendered views resulting in unwrapped versions of the rendered views, each of the regions corresponds to a respective viewport of the viewports, and the unwrapped versions of the rendered views are stored in a common face of the cube map.

8. A computer system comprising:
a memory operable for storing data and instructions of an application;
a processor configured to execute the instructions for controlling rendering of three-dimensional (3D) environments; and
a graphics processing unit communicatively coupled to the processor and the memory, wherein the graphics processing unit is configured to perform, responsive to the instructions, a method comprising:
dividing at least one cube face of a cube into a plurality of surfaces;
assigning viewports to the plurality of surfaces;

determining coordinates of vertexes of a spherical shape in world-space projected onto the plurality of surfaces;

generating rendered views of the spherical shape projected onto the plurality of surfaces from perspectives of the viewports based at least on rendering the views using the coordinates, wherein the views comprise the vertexes; and generating a cube map based at least on expanding the rendered views into the at least one cube face, wherein the expanding comprises applying a transformation function to the rendered views of the spherical shape thereby increasing a uniformity of pixel density of the rendered views by adjusting world-space pixel sizes of pixels of the rendered views.

9. A computer system as described in claim 8, wherein the transformation function is a first transformation function and the determining coordinates of the vertexes is performed using a second transformation function:

$$\{u, v\} = \left\{\frac{x}{\sqrt{x^2 + y^2 + 1}}, \frac{y}{\sqrt{x^2 + y^2 + 1}}\right\},$$

wherein $\{u, v\}$ represents the coordinates, and
wherein further $\{x, y\}$ represents Cartesian coordinates of vertexes within a respective surface of the plurality of surfaces.

10. A computer system as described in claim 8, wherein the method further comprises:
performing a first rendering pass that performs the determining the coordinates of the vertexes and the rendering of the views; and
performing a second rendering pass that performs the expanding.

11. A computer system as described in claim 8, wherein the expanding the rendered views comprises performing a calculation:

$$\{u, v\} = \left\{\frac{x}{w + x\alpha + y\beta}, \frac{y}{w + x\alpha + y\beta}\right\},$$

wherein $$\frac{x - u}{u(x + y)},$$

wherein $|\beta|==|\alpha|$, wherein $\{u, v\}$ represents the vertexes projected onto the plurality of surfaces, wherein w represents a perspective value, and wherein further $\{x, y\}$ represents Cartesian coordinates of vertexes within a respective surface of the plurality of surfaces.

12. A computer system as described in claim 8, wherein the method further comprises rendering a scene using the cube map and wherein the cube map comprises an environment map or a shadow map.

13. A computer system as described in claim 8, wherein hardware of the graphics processing unit configured for multi-view rendering is used to perform the rendering of the views of the viewports.

14. A computer system as described in claim 8, wherein the dividing is of a cube face of the cube into quadrants and each of the viewports corresponds to a respective quadrant of the quadrants.

15. A non-transitory computer readable medium comprising a plurality of programmed instructions, which when executed by a processor in a computing device are operable to perform a method, the programmed instructions comprising:
instructions to divide at least one cube face of a cube into a plurality of surfaces;
instructions to assign viewports to the plurality of surfaces;
instructions to determine coordinates of vertexes of a spherical shape in world-space projected onto the plurality of surfaces;
instructions to generate rendered views of the spherical shape projected onto the plurality of surfaces from perspectives of the viewports based at least on rendering the views using the coordinates, wherein the views comprise the vertexes; and
instructions to generate a cube map based at least on expanding the rendered views into the at least one cube face, wherein the expanding comprises applying a transformation function to the rendered views of the spherical shape thereby increasing a uniformity of pixel density of the rendered views by adjusting world-space pixel sizes of pixels of the rendered views.

16. A non-transitory computer readable medium as described in claim 15, wherein the transformation function is a first transformation function and the coordinates are determined using a second transformation function:

$$\{u, v\} = \left\{\frac{x}{\sqrt{x^2 + y^2 + 1}}, \frac{y}{\sqrt{x^2 + y^2 + 1}}\right\},$$

wherein $\{u, v\}$ represents the coordinates, and
wherein further $\{x, y\}$ represents Cartesian coordinates of vertexes within a respective surface of the plurality of surfaces.

17. A non-transitory computer readable medium as described in claim 15, wherein the programmed instructions further comprise instructions for performing a first rendering pass that performs the determining the coordinates and the rendering of the views, and for performing a second rendering pass that performs the expanding.

18. A non-transitory computer readable medium as described in claim 15, wherein the expanding the rendered views into the at least one cube face comprise instructions for performing the transformation function:

$$\{u, v\} = \left\{\frac{x}{w + x\alpha + y\beta}, \frac{y}{w + x\alpha + y\beta}\right\},$$

wherein $$\frac{x - u}{u(x + y)},$$

wherein $|\beta|==|\alpha|$, wherein $\{u, v\}$ represents the vertexes projected onto the plurality of surfaces, wherein w represents a perspective value, and wherein further $\{x, y\}$ represents Cartesian coordinates of vertexes within a respective surface of the plurality of surfaces.

19. A non-transitory computer readable medium as described in claim 15, wherein the cube map comprises an environment map or a shadow map.

20. A non-transitory computer readable medium as described in claim 15, wherein the programmed instructions further comprise instructions for using graphics processor unit (GPU) hardware configured for multi-view rendering to execute the instructions for rendering the views of the viewports.

21. A non-transitory computer readable medium as described in claim 15, further comprising instructions for storing the at least one cube face as the cube map in a memory of a computer system.

* * * * *